US012000505B2

(12) United States Patent
Kalyanasundaram et al.

(10) Patent No.: US 12,000,505 B2
(45) Date of Patent: Jun. 4, 2024

(54) SYSTEMS AND METHODS FOR DETERMINING FAILURE IN A BACK PRESSURE BALANCED RELIEF VALVE

(71) Applicant: Emerson Automation Solutions Final Control US LP, Houston, TX (US)

(72) Inventors: Vishwa Kalyanasundaram, Stafford, TX (US); Katherine Si, Houston, TX (US)

(73) Assignee: Emerson Automation Solutions Final Control US LP, Houston, TX (US)

( * ) Notice: Subject to any disclaimer, the term of this patent is extended or adjusted under 35 U.S.C. 154(b) by 235 days.

(21) Appl. No.: 17/245,865

(22) Filed: Apr. 30, 2021

(65) Prior Publication Data

US 2021/0341078 A1    Nov. 4, 2021

Related U.S. Application Data

(60) Provisional application No. 63/017,767, filed on Apr. 30, 2020.

(51) Int. Cl.
*F16K 37/00* (2006.01)
*F16K 17/08* (2006.01)
*G01M 3/28* (2006.01)

(52) U.S. Cl.
CPC ........ *F16K 37/0091* (2013.01); *F16K 17/087* (2013.01); *G01M 3/2876* (2013.01)

(58) Field of Classification Search
CPC .... F16K 41/10; F16K 17/087; F16K 37/0091; G01M 3/2876
See application file for complete search history.

(56) References Cited

U.S. PATENT DOCUMENTS

| 2,693,822 | A | * | 11/1954 | Gerow | F16K 41/10 |
| | | | | | 137/315.07 |
| 2,878,828 | A | * | 3/1959 | Klafstad | F16K 17/0433 |
| | | | | | 251/282 |
| 3,027,916 | A | * | 4/1962 | Smith | F16K 17/087 |
| | | | | | 137/557 |
| 3,294,114 | A | | 12/1966 | Birkemeier | |
| 4,634,099 | A | * | 1/1987 | Danko | F16K 41/10 |
| | | | | | 251/86 |
| 4,995,589 | A | * | 2/1991 | Adishian | F16K 31/1221 |
| | | | | | 251/63.5 |

(Continued)

FOREIGN PATENT DOCUMENTS

| DE | 2600756 A1 | 11/1977 |
| DE | 102006021235 A1 | 11/2007 |

(Continued)

OTHER PUBLICATIONS https://www.merriam-webster.com/dictionary/piston (retrieved Aug. 23, 2023). (Year: 2023).*

(Continued)

*Primary Examiner* — Jessica Cahill
(74) *Attorney, Agent, or Firm* — Quarles & Brady LLP (57) ABSTRACT

A back pressure balanced relief valve can include a piston, a pressure balancing device, and a pressure sensor. A pressure chamber can be created between the pressure balancing device and the piston. The pressure sensor can be configured to monitor the pressure in the pressure chamber for indications of a potential failure of the balancing device.

20 Claims, 7 Drawing Sheets

(56) References Cited

U.S. PATENT DOCUMENTS

| | | | |
|---|---|---|---|
| 5,056,758 A * | 10/1991 | Bramblet | F16K 41/046 |
| | | | 277/513 |
| 5,711,340 A | 1/1998 | Gusky et al. | |
| 6,173,736 B1 | 1/2001 | Ligh | |
| 2012/0047945 A1 * | 3/2012 | Briglia | F16K 41/10 |
| | | | 251/366 |
| 2014/0041738 A1 * | 2/2014 | Coleman | F17D 5/02 |
| | | | 137/510 |
| 2020/0271236 A1 * | 8/2020 | Meshaikhis | F16K 41/10 |

FOREIGN PATENT DOCUMENTS

| | | |
|---|---|---|
| EP | 0096616 A1 | 12/1983 |
| EP | 3421847 A1 | 1/2019 |
| FR | 1491463 A | 8/1967 |
| GB | 836387 | 6/1960 |
| GB | 1446704 A | 8/1976 |

OTHER PUBLICATIONS

Emerson, Crosby J-Series Direct Spring Pressure Relief Valves, technical data, undated, 92 pages.
CCPS, Process Safety Beacon, pressure relief valve bonnets, publication, <www.aiche.org/CCPS/Publications/Beacon/indes.aspx>, AIChE copyright 2013, 1 page.

* cited by examiner

SYSTEMS AND METHODS FOR DETERMINING FAILURE IN A BACK PRESSURE BALANCED RELIEF VALVE

BACKGROUND

Pressure relief valves are used extensively in fluid systems and vessels where pressure protection is required. For example, in some systems, excess pressure can lead to disruption of processes, instrument failure, or other equipment failure. Pressure relief valves allow excess pressure to be relieved by allowing pressurized fluid to flow through an auxiliary passage out of a system. Some fluid systems include a pressure relief valve that can be subject to back pressure, for example, when the pressure relief valve is not vented directly to atmosphere.

SUMMARY

Generally, embodiments of the invention can provide monitoring systems to help identify potential failures in components of pressure balancing assemblies, including pressure-balancing bellows or diaphragms of back pressure balanced relief valves.

Some embodiments of the invention provide a back pressure balanced relief valve system. The relief valve system can include a piston, one of a bellows or a diaphragm, and a pressure sensor. A pressure chamber can be created between the piston and the one of the bellows or the diaphragm. The pressure sensor can be in fluid communication with the pressure chamber, and can be configured to monitor the pressure in the pressure chamber for indications of a potential failure of the one of the bellows or the diaphragm.

Some embodiments of the invention can provide a back pressure balanced relief valve system. The back pressure balanced relief valve system can include a piston, a balancing device, and a pressure port. The balancing device can include one of a pressure-balancing bellows or a pressure-balancing diaphragm and defines a first pressure chamber between the piston and the balancing device. The pressure port can be in fluid communication with the first pressure chamber. The pressure port can be configured to receive or be in fluid communication with a pressure sensor for the pressures sensor to monitor the pressure in the first pressure chamber for indications of a potential failure of the balancing device.

In some embodiments, a back pressure balanced relief valve system can include a control system configured to monitor the pressure in a first pressure chamber and provide an alert based on the pressure in the first pressure chamber.

In some embodiments, a back pressure balanced relief valve system can include a control system configured to provide an alert based on the pressure in a first pressure chamber being above a first reference pressure for longer than a threshold time In some embodiments, a back pressure balanced relief valve system can include a bonnet that defines a second pressure chamber between the bonnet and a piston. A second pressure port can be in fluid communication with the second pressure chamber. The second pressure port can be configured to receive or be in fluid communication with a second pressure sensor for the second pressure sensor to monitor the pressure in the second pressure chamber. A control system can be configured to provide an alert based on the pressure in the second pressure chamber.

In some embodiments, a back pressure balanced relief valve system can include a control system configured to provide an alert, to indicate a potential failure of a balancing device, based on determining that the pressure in a second pressure chamber is substantially less than the pressure in a first chamber or is below a second pressure threshold.

In some embodiments, a back pressure balanced relief valve system can include a control system configured to provide an alert, to indicate a potential bonnet malfunction, such as a bonnet venting or pipe away malfunction, for example, based on determining that the pressure in a second pressure chamber is not substantially less than the pressure in a first chamber or is not below a second pressure threshold.

In some embodiments, a back pressure balanced relief valve system can include a control system configured to calculate a leak rate for a balancing device based on the pressure in a first pressure chamber.

In some embodiments, a back pressure balanced relief valve system can include a bonnet on an opposing side of a piston from a first pressure chamber. A flow meter can be configured to monitor a flow through the bonnet to atmosphere. A control system can be configured to determine a rupture area of a balancing device based on a flow through the bonnet as measured by the flow meter.

In some embodiments, a back pressure balanced relief valve system can include a bonnet that defines a second pressure chamber between the bonnet and a piston. A control system can be configured to calculate a rupture area for a balancing device based on a measured pressure in the second pressure chamber and based on a back pressure of the back pressure balanced relief valve system, and to calculate the leak rate based on the calculated rupture area.

In some embodiments, a back pressure balanced relief valve system can include a control system configured to calculate a maximum leak rate for the back pressure balanced relief valve system, based on a maximum back pressure of the back pressure balanced relief valve system.

In some embodiments, a back pressure balanced relief valve system can include a balancing device that includes a pressure-balancing diaphragm. The pressure-balancing diaphragm can be part of a retrofit assembly configured for conversion of a valve to a diaphragm-operated back pressure balanced relief valve system.

Some embodiments provide a method of detecting failure in a back pressure balanced relief valve. The method can include providing flow through a back pressure balanced relief valve that includes a piston, one of a bellows or a diaphragm, and a pressure sensor in fluid communication with a pressure chamber between the piston and the one of the bellows or the diaphragm. Using the pressure sensor, the pressure in the pressure chamber can be electronically monitored. The method can further include providing an alert, using a control system that is in communication with the pressure sensor, based on the pressure in the pressure chamber being above a reference point.

Some embodiments provide a method of detecting failure in a relief valve. The method can include electronically monitoring a pressure in a first chamber and a second chamber of the relief valve using a pressure sensor; and providing an alert of a potential failure, using a control system in communication with the pressure sensor, based on the pressure in the first pressure chamber being above a reference point.

Some embodiments provide a method of detecting a potential failure in a relief valve. The method can include using, a pressure sensor, electronically monitoring a pressure in a first pressure chamber being defined by one or more of a piston or a bonnet of the relief valve, and by one of a bellows or a diaphragm of the relief valve. The method can also include using a control system in communication with the pressure sensor, providing an alert of a potential failure of the relief valve based on an increase in pressure in the first pressure chamber.

In some embodiments, a method of detecting a potential failure in a relief valve can include using a control system in communication with a pressure sensor, providing an alert of a potential failure of the relief valve based on an increase in pressure in a first pressure chamber.

In some embodiments, a method of detecting a potential failure in a relief valve can include determining a leak rate from a first pressure chamber based on one or more of the pressure in a first pressure chamber, a back pressure of the relief valve, or a clearance area of a piston.

In some embodiments, a method of detecting a potential failure in a relief valve can include providing an alert. Providing the alert can include calculating a rupture area for one of a bellows or a diaphragm based on the pressure in a first chamber and one or more of: a system back pressure or a measured flow rate through a bonnet.

In some embodiments, a method of detecting a potential failure in a relief valve can include providing an alert which can include determining a maximum leak rate through a bonnet valve based on a maximum expected system back pressure.

Some embodiments provide a back pressure balanced relief valve system. The back pressure balanced relief valve system can include a piston, a bonnet, a bellows, and a first pressure sensor. The bonnet can create a bonnet chamber between the piston and the bonnet. The bellows can create a bellows chamber between the piston and the bellows, the bellows chamber can be in fluid communication with the bonnet chamber. The first pressure sensor can be in fluid communication with the bellows chamber, the pressure sensor configured to monitor the non-transient pressure in the bellows chamber and provide an alert of a potential bellows failure if the non-transient pressure in the bellows chamber increases above zero gauge pressure.

Some embodiments provide a back pressure balanced relief valve. The back pressure balanced relief valve can include a valve body, a valve seat within the valve body, a disc assembly configured to move relative to the valve seat to permit or restrict flow through the valve body, a piston configured to move with the disc assembly, a bonnet that defines a bonnet chamber between the piston and the bonnet, a bellows that defines a bellows chamber between the piston and the bellows, the bellows chamber in fluid communication with the bonnet chamber across the piston, a first pressure sensor in fluid communication with the bellows chamber, the first pressure sensor configured to monitor non-transient pressure in the bellows chamber, and an electronic controller configured to monitor non-transient pressure in the bellows chamber to identify a potential bellows failure.

In some embodiments, a back pressure balanced relief valve can include an electronic controller configured to provide an alert of a potential bellows failure based on non-transient pressure in a bellows chamber increasing above zero gauge pressure.

In some embodiments, a back pressure balanced relief valve can include a second pressure sensor in fluid communication with a bonnet chamber. An electronic controller can be configured to provide an alert of a potential bonnet malfunction based on first and second pressure sensors detecting a pressure increase in the bonnet chamber and a pressure increase in a bellows chamber.

Some embodiments provide a diaphragm assembly. The diaphragm assembly can include a diaphragm, a bonnet adapter, a spacer, and a piston plate. The diaphragm can be disposed between a valve body and a bonnet of a pressure relief valve, a disc holder of the pressure relief valve extending through a central portion of the diaphragm. The bonnet can at least partially surround the diaphragm and is seated between the diaphragm and the bonnet. The spacer can be engaged with a first side of the central portion of the disc holder. The piston plate can be engaged with a second side of the central portion of the disc holder opposite the spacer. The diaphragm assembly can be configured as a retrofit assembly for the pressure relief valve.

In some embodiments, a diaphragm assembly is a retrofit for a non-back pressure balanced relief valve.

In some embodiments, a diaphragm assembly defines an effective area that is equal to a nozzle area of the pressure relief valve.

In some embodiments, a diaphragm assembly can include a spacer. The spacer can include a pressure tap configured to receive a pressure sensor to monitor the pressure in a first pressure chamber between a piston of a pressure relief valve and a diaphragm.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As briefly discussed above, certain systems and vessels require pressure protection to avoid over-pressurization. Spring-operated pressure relief valves can be used in such systems to relieve and divert excess fluid pressure. In general, spring-operated pressure relief valves include a spring that is compressed by a predetermined value. The spring provides a corresponding force on a valve disc in a valve-closing direction (e.g., downward), thereby biasing the valve toward a closed position. The compression of the spring can be adjusted via a spring adjustment mechanism, such as an adjustable screw that controls the degree of compression of the spring for a given valve of lift. When an opening (e.g., upward) force exerted by a pressurized fluid acting on the valve disc equals the closing (e.g., downward) force of the spring, plus any ancillary forces (e.g., due to the weight of a disc assembly), the valve begins to open to relieve system pressure. As the fluid pressure continues to increase, the spring is further compressed, and the valve is further opened.

Spring-operated pressure relief valves are generally configured to provide a set pressure, which is typically predetermined and preset before installation of the valves. The set pressure is typically a pressure at which the valve opens and there is a significant relief of system pressure, although other definitions are applied in different installations, as is known in the industry. In some instances, the set pressure may be defined as the pressure at which a first audible response (i.e., "pop") can be heard by a user, as a spring-operated pressure relief valve releases system pressure, or may be defined as the pressure at which leakage through a valve is first audible for human operators. As appropriate, the set pressure for a particular valve can be adjusted by varying the compression of a spring within the valve, including by adjusting a pressure adjustment screw to compress or release a spring by a certain amount.

Also as briefly described above, some fluid systems include a pressure relief valve that is subject to back pressure. Pressure relief valves that experience back pressure may be part of a common pipe header, a discharge system with high piping losses, or other pressurized systems that do not directly vent to the atmosphere. Generally, back pressure is introduced via the outlet of a valve (i.e., downstream of the valve seat). Thus, in some cases, back pressure can result in an additional force on a disc holder in a valve-closing direction within a valve. This added force on the disc holder can affect (i.e., increase) the set pressure and, correspondingly, the appropriate functioning of the pressure relief valve to relieve system pressure. Other potential negative effects of back pressure on a relief valve can include fluid from the valve outlet being unintentionally vented to the atmosphere through a bonnet that covers the spring, among others.

In general, two types of back pressure include superimposed back pressure and built-up back pressure. Superimposed back pressure is pressure that exists at the valve outlet at the time when the valve is required to operate. Built-up back pressure is pressure that exists at the valve outlet caused by flow through the valve and discharge system. In some cases, both types of back pressure may need to be addressed for optimal valve performance.

One known method of accommodating back pressure includes lowering the set pressure of the valve to compensate for the back pressure at the valve outlet. However, this method is only applicable for constant back pressure conditions and relies on proactive identification of the magnitude of the back pressure. Another method for combating negative effects of back pressure on a relief valve includes adding a balancing device that prevents back pressure from imparting a net downward force on the disc holder of the valve. The balancing device can maintain the set pressure of the valve in the presence of both variable and constant back pressure and can also help to protect against inadvertent venting of fluids through the bonnet as a result of the back pressure.

Back pressure balanced relief valves can use designs such as bellows, diaphragms, pistons, etc., and combinations thereof, that offset the effects of back pressure. Such back pressure balanced relief valves generally include a bonnet referenced to atmospheric pressure or near atmospheric pressure. In contrast, valves that are not balanced for back pressure generally include a bonnet that is closed or vented to the outlet of the valve and does not reference atmospheric pressure.

Figure 1:
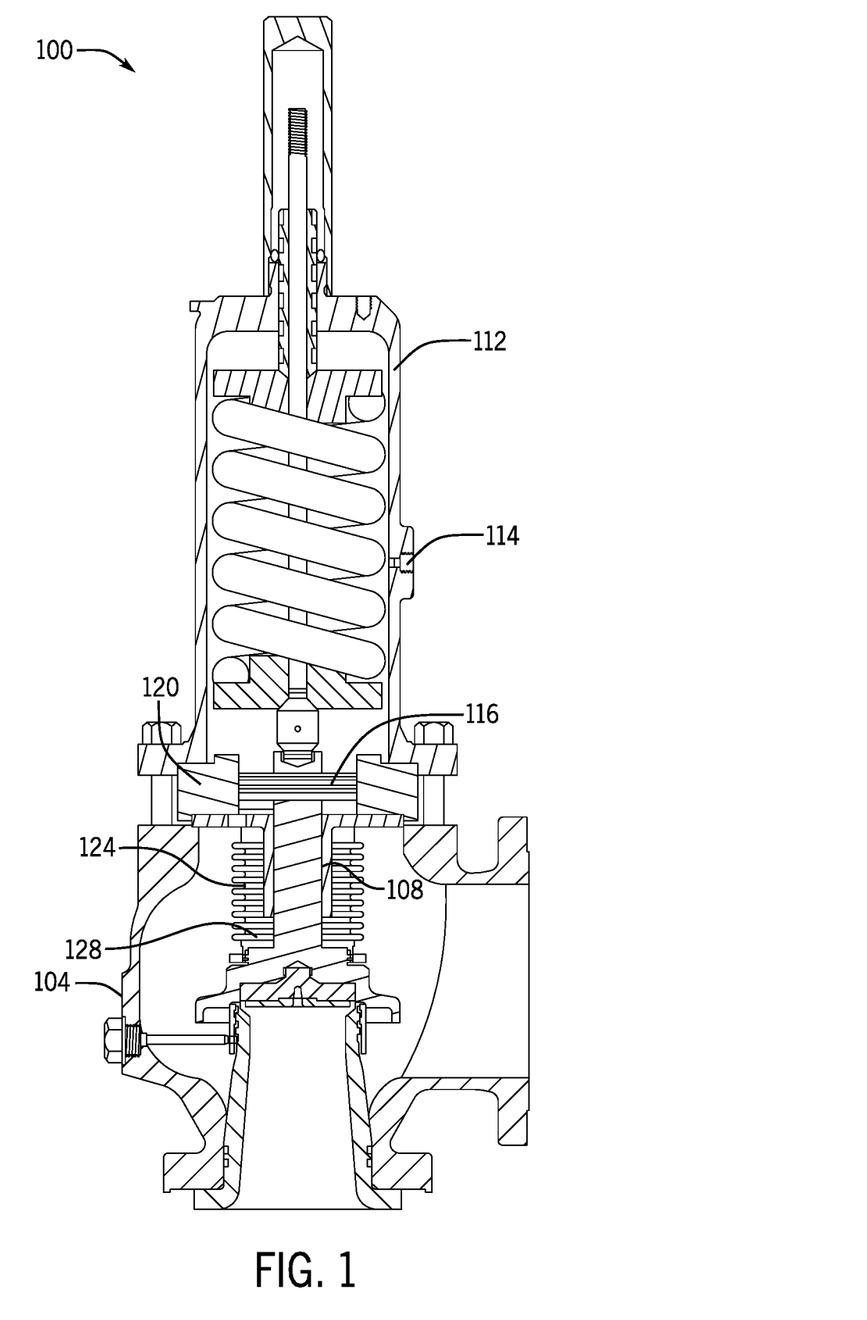
FIG. 1 is a cross-sectional view of a back pressure balanced relief valve.

Referring now to FIG. 1, a back pressure balanced relief valve 100 is illustrated. The back pressure balanced relief valve 100 includes a valve body 104 that houses an inlet nozzle and an outlet, and a bonnet 112 that houses a spring that provides a force on a disc holder 108 in a valve-closing direction (i.e., toward the inlet nozzle). Further, a back pressure balancing system in the back pressure balanced relief valve 100 includes a bonnet vent 114 that vents the bonnet 112 to the atmosphere or other outlet through a bonnet vent 114, a piston 116, a bonnet spacer 120 that provides a piston housing, and a bellows 124. The back pressure balanced relief valve 100 further includes a bellows chamber 128 that is defined by the bellows 124 and the piston 116. In general, the piston 116 of the back pressure balanced relief valve 100 provides a supplemental back pressure balance mechanism. However, in other embodiments, a back pressure balanced relief valve can include a bellows structure, otherwise similar to the bellows 124, for example, without a piston.

Generally, the bellows 124 can offset the effects of back pressure at the outlet by providing an effective reduction in the surface area of the disc holder 108 that is exposed to the back pressure, such that a net force from the back pressure on the disc holder 108 is effectively zero. As a result, while the bellows 124 is operational, any effects of the back pressure on the opening of the valve 100 may be minimized and the set pressure of the back pressure balanced relief valve 100 can be appropriately maintained, even in cases of varying back pressure.

Further, in the back pressure balanced relief valve 100 as shown, the piston 116 can provide supplementary back pressure balancing, including by taking over partial functionality of the bellows 124 if the bellows 124 fails. For example, due to a relatively small clearance between the piston 116 and the bonnet spacer 120, infiltration of the back pressure into the bellows chamber 128 will result in an upward force on the piston 116. Due to similar projected surface areas of the piston 116 and the disc holder 108 within the bellows 124, this upward force can generally counterbalance the concordant increase in downward force on the disc holder 108. Thus, the piston 116 can provide a layer of protection so that valve performance is not substantially affected during a bellows failure. However, the piston 116 and the bonnet spacer 120 have a clearance and do not include seals therebetween. Therefore the piston 116 does not provide complete containment of a service medium (i.e., a fluid) that has breached the bellows 124 and can allow leakage to the atmosphere through the bonnet vent 114.

As also described below (see, e.g., FIG. 5), other examples of pressure balanced relief valves can include a diaphragm in place of a bellows. Similar to a bellows, a diaphragm helps to equalize the effects of back pressure that may enter through a valve outlet by converting the back pressure to an upward force that is generally equal to the corresponding downward force induced by the back pressure on the disc holder: i.e., so that the net force from the back pressure that resists valve opening is substantially zero. In the event of a bellows rupture, an associated piston can operate similarly to the piston 116 to mitigate some of the resulting pressure effects.

Although piston designs can provide fallback protection in the event of some types of failures of pressure balanced relief valves (e.g., ruptures in pressure-balancing bellows or diaphragms), it can be generally useful to detect a failure of a balancing device within a pressure relief valve. For example, if the balancing device fails (e.g., if a bellows ruptures), the functionality of the valve may be compromised and its ability to relieve a required capacity of fluid at the required pressure may be affected. In other instances of failure of a balancing device, fluid from the valve outlet may be vented to the atmosphere through a bonnet, which may be undesirable. As a result, it may be useful to promptly detect and characterize potential failures of the balancing device in a back pressure balanced relief valve.

In some embodiments, a pressure relief valve failure detection system configured according to the invention can address these (or other) issues. For example, in some embodiments, a pressure relief valve according to the invention can include a pressure sensor that is in fluid communication with a pressure chamber that is created by and between a balancing device (e.g., a diaphragm or a bellows) and a piston. A control system that includes the pressure sensor can be configured to monitor the pressure within the pressure chamber and provide an alert based on that monitoring to indicate potential problems. For example, elevated pressures (e.g., above 0 psig) can indicate that a balancing devices has failed and that fluid, pressurized by the back pressure in the valve, has infiltrated the pressure chamber. In different cases, alerts can be provided in different ways, including as an alarm, an update to a log, a transmitted flow parameter of note (e.g., a leakage rate, or rupture size) or other communication, etc.

In some embodiments, the control system can provide multiple levels or degrees of alerts. For example, an initial alert can indicate a minute leakage that can correspond to a small, but operable rupture in the balancing device, with which the valve remains operational. The initial alert can be logged in a database, for example, and referenced to when planning or scheduling valve maintenance. Further, the control system can continue to monitor any growth in the rupture or leak rate to provide a secondary alert. For example, the secondary alert can indicate a more urgent actual or potential failure than the initial alert (e.g., as may correspond to a rupture size or leak rate that exceeds one or more associated thresholds). Thus, in general, multiple levels or degrees of alerts can indicate progressive growth of a rupture in the balancing device which can also aide in planning or scheduling valve maintenance.

Figure 2:
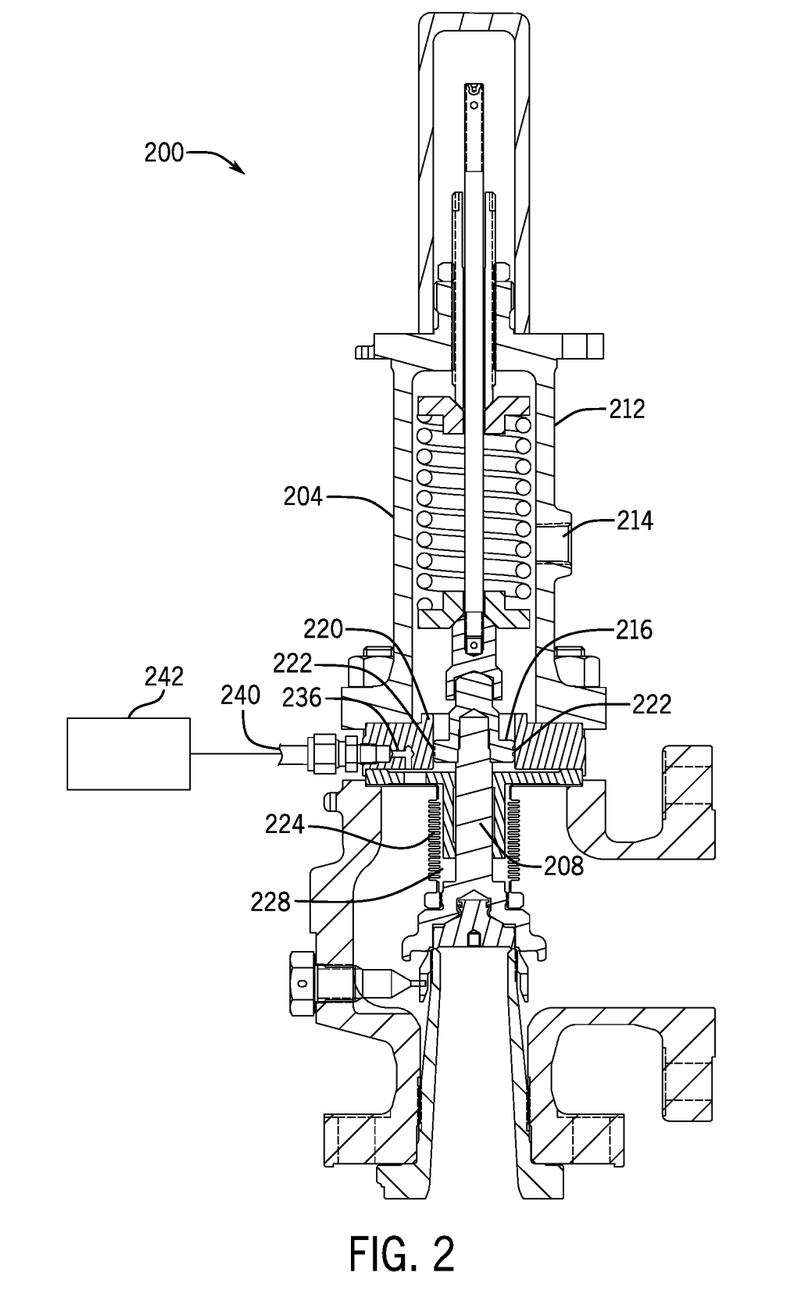
FIG. 2 is a cross-sectional view of a back pressure balanced relief valve, including a bellows assembly and a pressure sensor, according to an embodiment of the invention.

Illustrated in FIG. 2 is an example of a back pressure balanced relief valve 200 that is equipped according to an embodiment of the invention. In some regards, the back pressure balanced relief valve 200 is similar to the back pressure balanced relief valve 100 of FIG. 1. For example, the back pressure balanced relief valve 200 similarly includes a valve body 204, a spring that provides a force on a disc holder 208 in a valve-closing direction, an inlet nozzle, and an outlet. A balancing system in the back pressure balanced relief valve 200 includes a bonnet 212 that is vented to the atmosphere or other outlet through a bonnet vent 214, a piston 216, and a bonnet spacer 220 that provides a piston housing. In the example shown, there is a piston orifice 222 between the piston 216 and the bonnet spacer 220 that, in some scenarios, can allow limited fluid flow, as further described below.

In the example shown, the back pressure balanced relief valve 200 also includes a bellows 224. The bellows 224 and the piston 216 define a bellows chamber 228, which is a pressure chamber created by the contained volume between the bellows 224 and the piston 216, opposite the piston 216 from a bonnet chamber defined by the bonnet 212 and the piston 216 (i.e., as defined by the bellows 224, the piston 216, and the bonnet spacer 220 in the illustrated example). However, other configurations are possible. In some embodiments, a back pressure balanced relief valve (e.g., similar to the relief valve 200) may include a diaphragm (see, for example, FIG. 5) or other balancing devices.

As used herein, "pressure chamber" does not necessarily refer to a fully sealed volume. For example, as generally discussed above, no seal is provided between the piston 216 and the bonnet spacer 220, although the close clearance between the two components (i.e., the piston orifice 222) may substantially restrict fluid flow. Accordingly, the bellows chamber 228 may be able to sustain elevated pressures relative to surrounding volumes (e.g., a pressure chamber defined by the bonnet 212), including with the presence of back pressure at the outlet of the valve. Similarly, as used herein, "pressure chamber" does not necessarily refer to a volume that includes only a single compartment. For example, as shown in FIG. 2, the bellows chamber 228 includes a compartment within the bellows 224, one or more orifices in a disc guide above the bellows, and a further compartment between the disc guide and the piston 216.

Further illustrated in FIG. 2, the back pressure balanced relief valve 200 includes a pressure tap 236 through the bonnet spacer 220. The pressure tap 236 can allow a pressure sensor, e.g., a pressure transducer 240, to monitor the pressure in the bellows chamber 228. In the example shown, the pressure sensor is configured as a pressure transducer, but other configurations are possible. For example, the pressure sensor may be a pressure transmitter, pressure switch, or any pressure measuring device. Additionally, as shown, the pressure tap 236 extends through the bonnet spacer 220, but in other configurations a pressure tap may monitor the pressure in the bellows chamber 228 by extending through the piston 216, for example, or through other components.

In some embodiments, the pressure transducer 240 can be in communication with a control system, such as a local or remote electronic control system (e.g., a remote electronic control system 242 of various generally known configurations). Among other functionality, the control system can be configured to monitor the pressure readings from the pressure transducer 240 and provide an alert if pressure in the bellows chamber 228 suggests a potential failure of the bellows 224 (e.g., if the pressure is above a reference threshold pressure). For example, during normal operation of the back pressure balanced relief valve 200 the steady-state pressure inside the bellows chamber 228 may be at 0 psig (or another threshold pressure). If the pressure transducer 240 measures a non-transient pressure inside the bellows chamber 228 that is greater than 0 psig, this may indicate that a rupture in the bellows 224 has exposed the bellows chamber 228 to back pressure, and the control system can provide an alert accordingly (e.g., record the elevated pressure or a related indicator to a log, transmit an alarm for operator action, etc.).

In some examples, a substantial non-zero gauge pressure (e.g., above 0.07 psig or another threshold pressure) can correspond to a bellows failure, such as a puncture or rupture in the bellows 224 that allows a service medium from the outlet of the valve to the bellows chamber 228. In one example, depending on particularly system configurations and sensitivities, a control system may provide one or more alerts when a non-transient pressure inside the bellows chamber 228 is above 0 psig (e.g., less than 1 inches of water column gauge) to as high as the back pressure at the outlet of the valve 200.

As also discussed above, in the case of a failure of the bellows 224, the piston 216 can postpone a more substantial valve failure by counterbalancing the force of the back pressure on the disc holder 208 and thereby preventing substantial changes in valve set pressure. However, although the piston orifice 222 can restrict fluid flow, it does not provide the same containment as the intact bellows 224, because the clearance between the piston 216 and the bonnet spacer 220 generally does not incorporate a seal. As a result, providing an alert based on the detection of the heightened pressure in the bellows chamber 228 can alert a user of a potentially significant valve failure while there is still time to fix or replace the back pressure balanced relief valve 200. In some embodiments, a seal, including a hard seal, may be effected between the piston 216 and the bonnet spacer 220 which can increase the detection level of smaller rupture areas.

In some cases, an alert may be provided only if a change in pressure in a bellows (or other) chamber is sufficiently non-transient (e.g., is present for more than a threshold amount of time, or exhibits another predetermined behavior. For example, when the valve 200 is opening or closing during normal operation, some transient pressure spikes may be seen due to the delayed equalization of pressures between the bellows chamber 228 and the bonnet 212. However, if the bellows 224 is appropriately operational, any such pressure spikes can be expected to quickly resolve (e.g., return to 0 psig) once the disc holder 208 and the piston 216 are stationary (e.g., once the valve 200 is closed). An appropriate threshold amount of time, as with other criteria for identifying non-transient pressure changes, can vary depending on the particular characteristics of a particular valve or installed system. However, in some embodiments, a spike in pressure can be treated as transient if the spike is resolved (e.g., returns to 0 psig or other threshold) within approximately 100 to 800 milliseconds.

As described above, a steady-state heighted pressure in the bellows chamber 228 can sometimes indicate a bellows failure. In other scenarios, however, a non-transient elevated pressure in the bellows chamber 228 (e.g., greater than 0 psig) can correspond to a non-transient increase in pressure in the bonnet 212, rather than from a bellows failure. In some cases, such an increase in pressure in the bellows chamber 228 can accordingly indicate a problem with the bonnet vent 214 rather than with the bellows 224. For example, the bonnet 212 being plugged or the occurrence of a malfunction in a pipe-away system for the bonnet 212 can sometimes result in an increase in pressure within the bonnet 212. This may cause a corresponding increase in pressure within the bellows chamber 228, even though the bellows 224 may be fully intact and operational.

Figure 3:
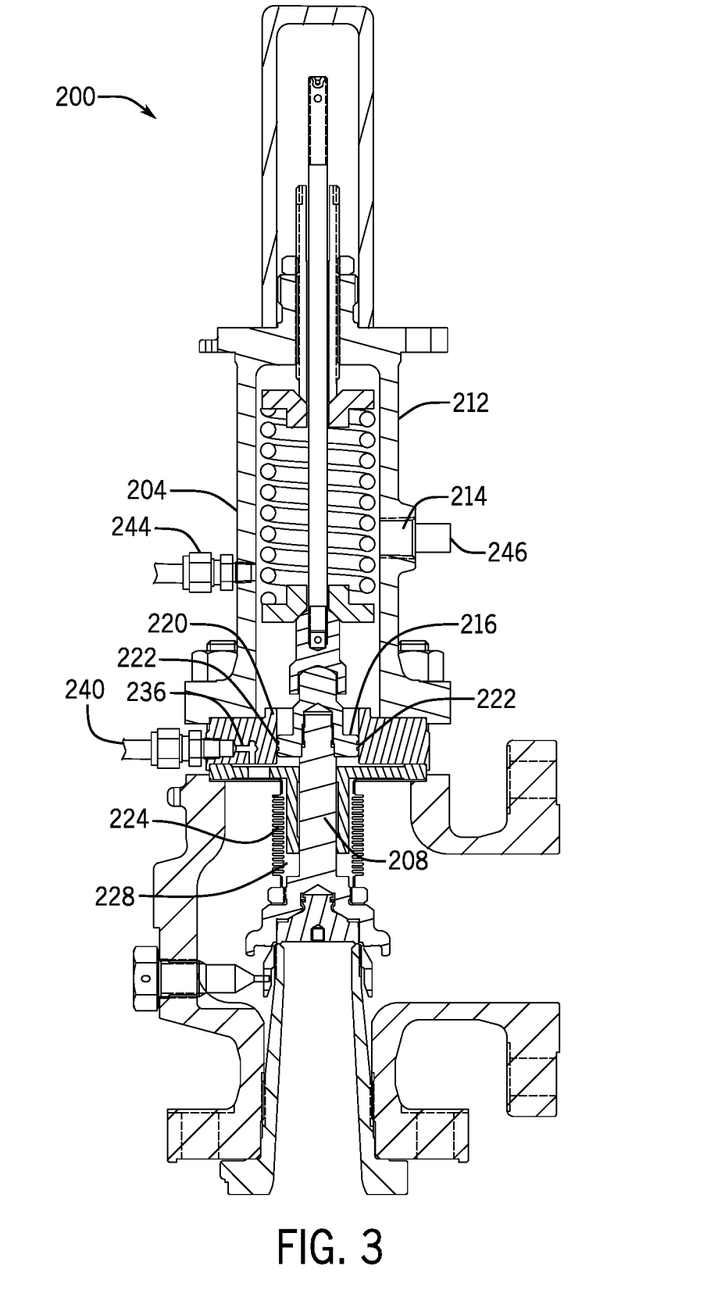
FIG. 3 is a cross-sectional view of the back pressure balanced relief valve of FIG. 2, including a second pressure sensor, according to an embodiment of the invention.

Some embodiments of the invention can be configured to distinguish between increases in pressure that may result from a bonnet malfunction (e.g., as described above) and increases in pressure that may result from a bellows (or other similar) failure. Referring now to FIG. 3, for example, the valve 200 can in some cases be equipped with a second pressure transducer 244. In particular, as shown, the second pressure transducer 244 can monitor the pressure in the bonnet 212. In some embodiments, the second pressure transducer 244 is a second pressure sensor, and may be similar to the pressure transducer 240 that can monitor the pressure in the bellows chamber 228. In some embodiments, a single multivariable pressure transducer configured to identify pressure differential and pressure at one of the two locations can be used.

In general, the presence of the pressure transducer 240 monitoring the bellows chamber 228 and of the second pressure transducer 244 monitoring the bonnet 212 can allow a control system (e.g., control system 242, as in FIG. 2) to determine whether a non-transient (e.g., steady) elevated pressure reading for the bellows chamber 228 may indicate a potential bonnet failure or a potential bellows failure. Specifically, a pressure increase in both the bonnet 212 and the bellows chamber 228 (e.g., above 0 psig) may generally indicate a malfunction associated with the bonnet 212 (e.g., at the bonnet vent 214). In contrast, a pressure increase in only the bellows chamber 228 (e.g., above 0 psig) may generally indicate a failure associated with a bellows or other balancing device. As a result, in some embodiments, the control system may provide a bellows (or, generally, a balancing device) failure alert if there is a substantial non-transient pressure differential between the bellows chamber 228 and the bonnet 212 (e.g., a differential of greater than 0.5 psi or of greater than 5%). In contrast, the control system may provide a bonnet failure alert if there is a substantial non-transient increase in pressure in each of the bellows chamber 228 and the bonnet 212 (e.g., an increase of greater than 0.5 psi or of greater than 5%). Alternatively, some control systems may be configured, when there is an elevated pressure in the bellows chamber 228, to provide a bellows alert if the bonnet pressure does not exceed a threshold pressure (e.g., 0 psig) or to provide a bonnet alert if the bonnet pressure does exceed a threshold pressure (e.g., 0 psig).

Generally, when there is a bellows failure for the back pressure balanced relief valve 200, a flow from the outlet of the relief valve 200 to the bonnet vent 214 is established. Such flow is controlled by two restrictions (or orifices). The first restriction is the bellows rupture area, which can range from a pin hole to a substantial tear. The second restriction is the piston orifice 222 which is defined by the clearance area between the piston 216 and the bonnet spacer 220. During a bellows failure, the size of bellows rupture area and of the piston orifice 222 (individually or collectively) generally control the pressure that is developed in the bellows chamber 228, based on the corresponding characteristics of pressure-driven flow through the bellows chamber 228, the bonnet 212, and the bonnet vent 214.

With continued reference to FIG. 3, the valve 200 can in some cases be equipped with a flow meter 246. In particular, as shown, the flow meter 246 can monitor a fluid flow out of the bonnet 212 via the bonnet vent 214. In some cases, as further discussed below, the flow meter 246 can measure a fluid flow rate through the bonnet vent 214 during a bellows failure event.

Figure 4:
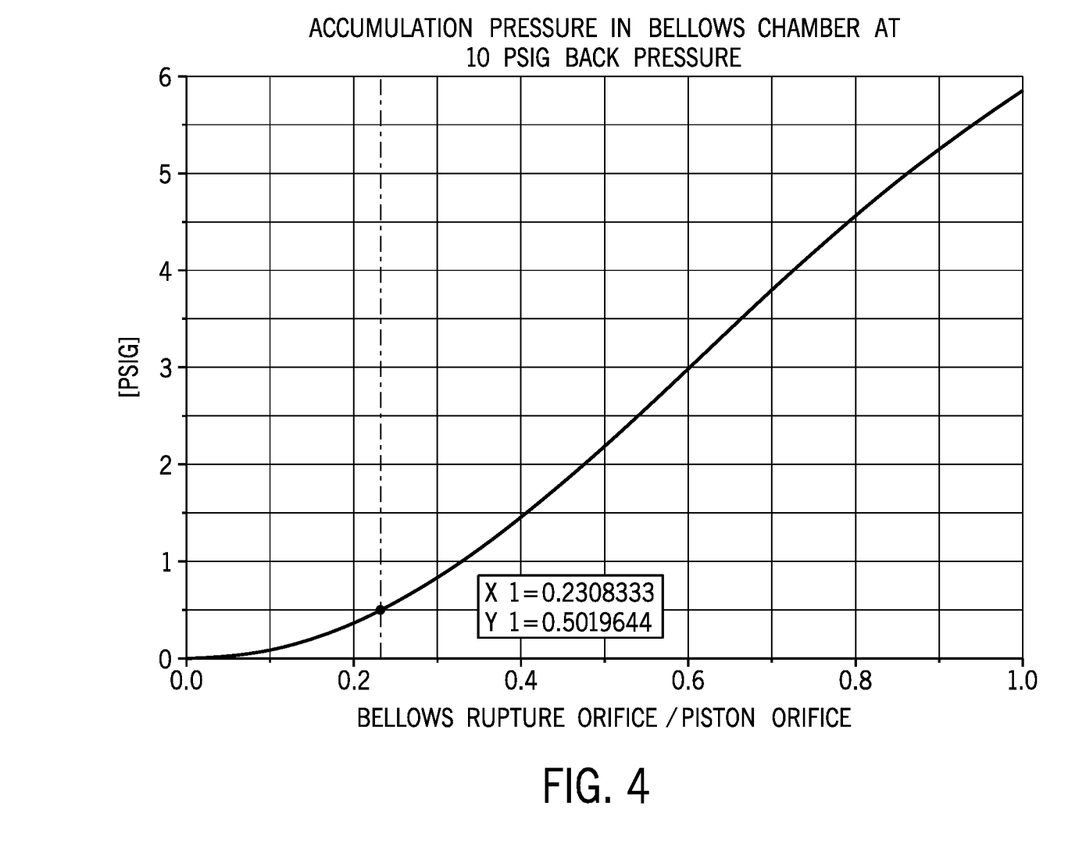
FIG. 4 is a graph of accumulated pressure in a bellows chamber vs. a ratio of a rupture orifice to a piston orifice, to support monitoring for bellows or diaphragm failure, according to an embodiment of the invention.

In general, the ability of a monitoring system of particular sensitivity to identify bellows (or other similar) failures based in pressure increases in a bellows (or other pressure) chamber may depend on the size of the relevant rupture area relative to the corresponding piston orifice and, in some cases, also on back pressure. FIG. 4 illustrates an example graphical representation of the non-transient gauge pressure inside the bellows chamber 228 during a bellows failure, plotted against a ratio of the sizes of the bellows rupture area and the piston orifice 222, for a system with 10 psig back pressure. In one implementation, as shown in FIG. 4, once the bellows rupture area is approximately 23% of the piston orifice 222 (see FIG. 2), 0.5 psig (i.e., 5% of the back pressure) is accumulated in the bellows chamber 228. Thus, for an economically manufactured valve of a similar configuration, a bellows failure may be detectable even when the bellows rupture is less than 25% of the size of the piston orifice 222 (e.g., ~0.006 in$^2$). It should be understood, however, that the data represented in FIG. 4 corresponds to a particular installation for particular equipment, and that variations in detectable non-transient gauge pressure and detectable sizes of bellows ruptures are possible.

The data profile of the graph of FIG. 4 can be generated via known fluid dynamics calculations, based on certain properties of the back pressure balanced relief valve 200, including system back pressure (e.g., as measured or predetermined) and the pressure within the bellows chamber 228, as measured via the pressure transducer 240. Accordingly, for a particular back pressure balanced relief valve (e.g., the relief valve 200), the existence and size of a bellows rupture can be detected, if the system back pressure is known. In particular, as represented in FIG. 4, from a known system back pressure and a measured bellows chamber pressure, a bellows rupture area can be (approximately) calculated. The calculated rupture area can then be used to determine a leak rate through a bonnet (e.g., the bonnet 212).

In a similar way, given a maximum expected system back pressure, a maximum leak rate through the bonnet 212 can be determined. In this regard, the flow restriction provided by a piston orifice can generally be considered as setting a maximum flow rate for a given pressure drop, because the size of a rupture in a balancing device can generally far exceed the size of the piston orifice. Further, curves similar to that of FIG. 4 (or corresponding lookup tables) can be constructed for particular relief valves to correlate orifice size to flow rates at a variety of back pressures. Accordingly, for example, based on a known area the piston orifice 222 and a maximum expected system back pressure, a maximum possible leak rate can be determined.

In some installations of a back pressure balanced relief valve (e.g., valve 200), a system back pressure may not be known. Nonetheless, in some cases, it may still be possible to detect and characterize a bellows rupture based on pressure and other measurements. For example, according to embodiments of the invention, the flow meter 246 can be used to measure a flow rate though the bonnet vent 214. This flow rate, in combination with a sensed pressure in the bellows chamber 228, can then be referenced to predetermined curves or lookup tables for the relief valve 200 to determine a corresponding rupture area. As a result, using the flow rate through the bonnet vent 214 and the pressure measured in the bellows chamber 228 via the pressure transducer 240, a bellows rupture can be detected down to a minute level (e.g., ~0.001 in$^2$ of rupture area). As with other examples above, relationships between parameters (e.g., rupture area and flow rate) may sometimes be specific to particular valves. Accordingly, some examples may rely on correlative relationships that are predetermined (e.g., empirically) during pre-installation characterization of a particular valve.

In some embodiments, for a given pressure measured in a bellows chamber, an associated leak rate through a bonnet can be calculated directly. For example, during characterization of the valve 200, curves or lookup tables can be established that correlate pressure in the bellows chamber 228 to a corresponding leak rate through the bonnet vent 214, at a variety of back pressures and orifice sizes. Further, the same or other characterization tests can establish a correlation between pressure in the bellows chamber 228 and orifice sizes, for a given back pressure. Thus, for example, for a known back pressure, a particular pressure in bellows chamber 228 may indicate a particular orifice size and a particular leak rate for a bellows rupture. The size of the bellows rupture area can also be calculated based on a known volume of the bellows chamber 228, the piston orifice 222 area, and the pressure in the bellows chamber 228, or using known derivations based on an assumed (e.g., standard) coefficient of discharge or flow coefficient.

Figure 5:
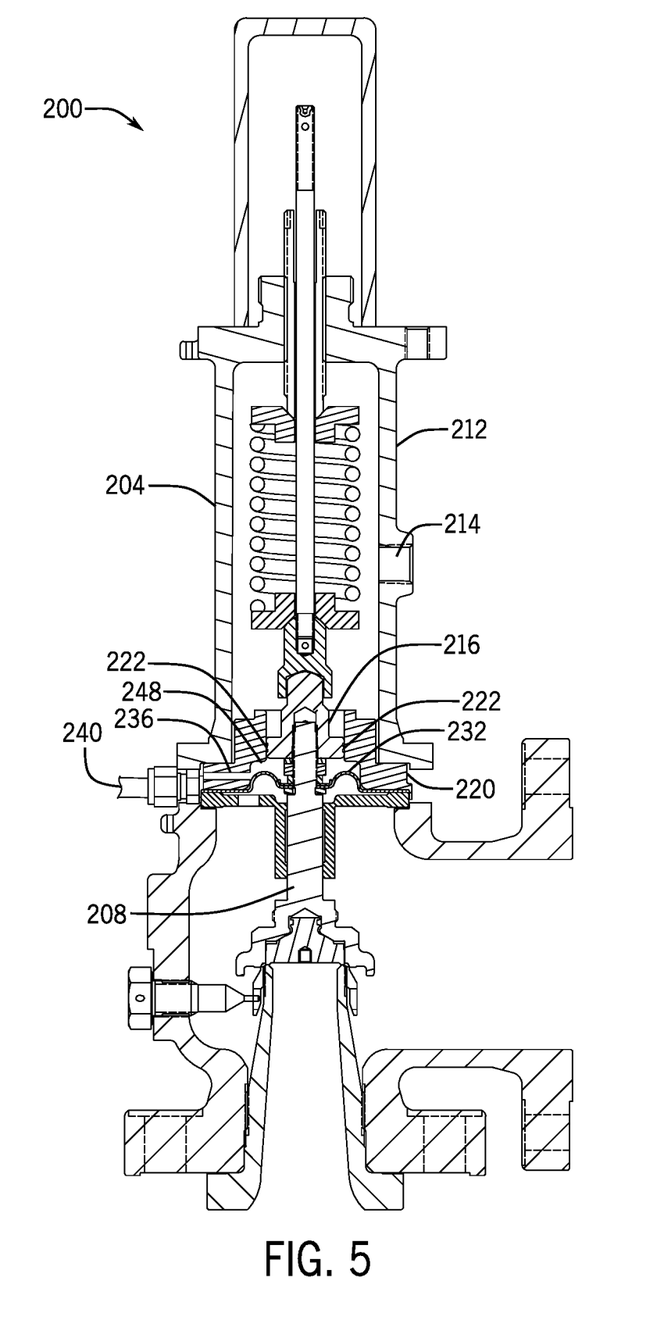
FIG. 5 is a cross-sectional view of a back pressure balanced relief valve, including a diaphragm assembly and a pressure sensor, according to an embodiment of the invention.

Although the detailed discussion above relates in particular to a valve with a bellows, including for the illustrated configuration of FIGS. 2 and 3, a similar approach can be employed in other systems, including with valves that have pressure balancing assemblies with differently configured bellows and with valves that have pressure balancing assemblies with diaphragms. Referring now to FIG. 5, for example, another potential configuration of the back pressure relief valve 200 according to an embodiment of the invention is shown. As illustrated, the configuration of the back pressure relief valve 200 in FIG. 5 is generally similar to the configuration of the back pressure relief valve 200 in FIG. 2, but a diaphragm 232 is provided, to balance back pressure, rather than the bellows 224.

In this regard, the diaphragm 232 creates a diaphragm chamber 248 between the diaphragm 232 and the piston 216, similar to the bellows chamber 228 created by the bellows 224 and the piston 216 (see FIG. 2). Correspondingly, as shown in FIG. 5, the pressure transducer 240 can extend through the pressure tap 236 to monitor the pressure in the diaphragm chamber 248, similarly to the bellows chamber 228. The pressure in the diaphragm chamber 248 can then be monitored using the pressure transducer 240 substantially similarly to the pressure in the bellows chamber 228, as described above relative to FIG. 2, and corresponding alerts can be provided accordingly. As such, the description and method of monitoring the pressure in the diaphragm chamber 248 and the configuration of FIG. 5 will be omitted to avoid repetition.

Additionally, in other embodiments, the back pressure balanced relief valve 200 equipped with the diaphragm 232 may further include the use of a second pressure sensor to monitor pressure within a bonnet chamber defined by the bonnet 212, such as with the second pressure transducer 244, as illustrated in FIG. 3. As similarly discussed above, the use of a second pressure sensor can allow the user to detect a specific failure mode when there is an increased non-transient gauge pressure in the diaphragm chamber 248. Similarly, monitoring for other indications of potential rupture events or bonnet malfunction can also proceed as generally discussed above, albeit with correlations that have been established for the valve 200 of FIG. 5 (or other diaphragm valves).

Figure 6:
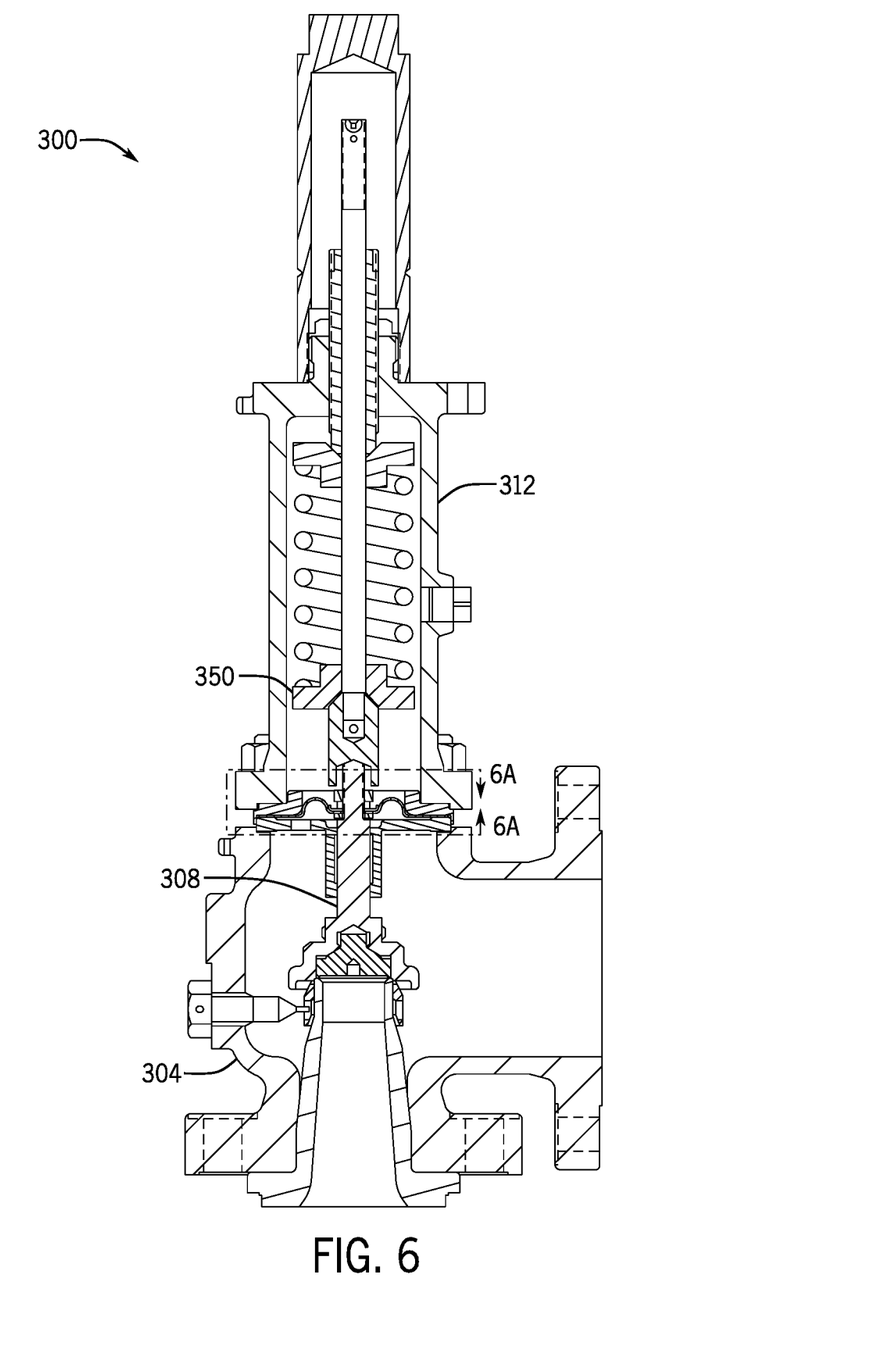
FIG. 6 is a cross-sectional view of a back pressure balanced relief valve retrofitted with a diaphragm assembly according to an embodiment of the invention.

Turning now to FIG. 6, embodiments of the invention provide a method of retrofitting a valve 300 with a diaphragm assembly 302 to provide the valve 300 with back pressure balancing capabilities. The retrofit can provide a valve with a diaphragm that is able to balance back pressure, similar to the diaphragm 232 and the valve 200 illustrated in FIG. 5. In general, the retrofit can be applied to a variety of valves, such as a valve that lacks back pressure balancing abilities or a valve having alternative back pressure balancing components. For example, the valve 100 shown in FIG. 1 or the valve 200 shown in FIGS. 2, 3, and 5 can be retrofitted with the diaphragm assembly 302. In the case of the valves 100 and 200 shown in FIGS. 1-3, the bellows 124, 224 can be stripped from the valve 100, 200 and the valve 100, 200 can be retrofitted with the diaphragm assembly 302. Therefore, in some embodiments, the valve 300 may be a retrofitted version of the valve 100 or the valve 200.

Figure 6A:
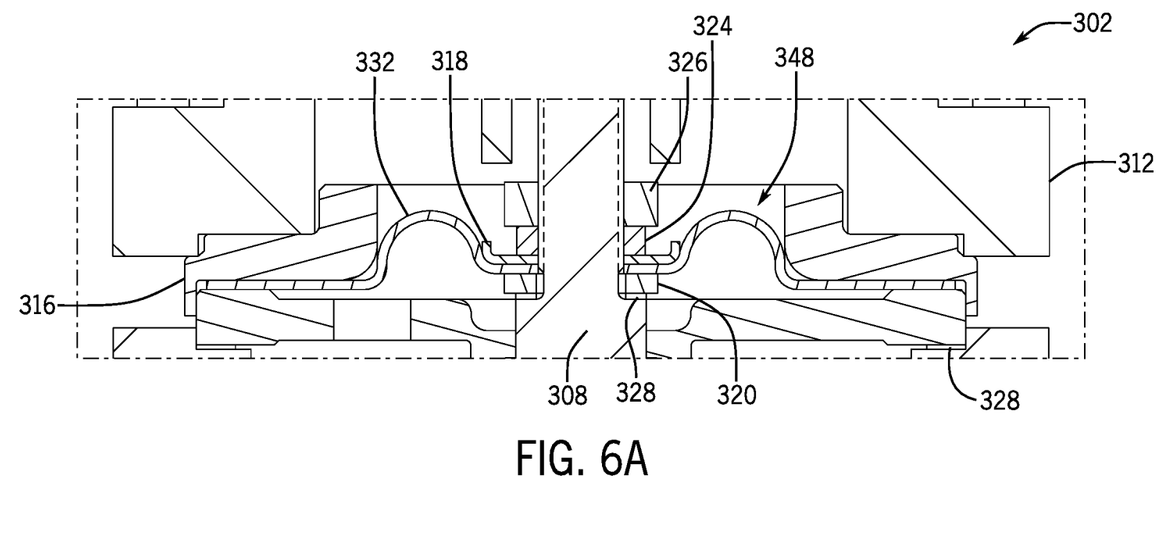
FIG. 6A is a cross-sectional detailed view of the diaphragm assembly of FIG. 6.

In general, the diaphragm assembly 302 can provide isolation of bonnet components from hazardous and/or corrosive media flowing through a valve. The diaphragm assembly 302 can include a diaphragm, such as a diaphragm 332, which can include an elastomeric material configured to provide a tight seal. The diaphragm assembly 302 can be disposed between a valve body 304 and a bonnet 312. A disc holder 308 of the valve 300 can extend through the diaphragm 332. As illustrated in FIG. 6A, the diaphragm assembly 302 can further include a bonnet adapter 316 and a piston plate 318. The bonnet adapter 316 surrounds a portion of the diaphragm 332 and is disposed (e.g., clamped) between the diaphragm 332 and the bonnet 310.

The diaphragm assembly 302 can also include a spacer 320 and a piston plate 318. The spacer 320 is positioned between the diaphragm 332 and the disc holder 308 to provide an appropriate spacing therebetween when the diaphragm 332 is clamped between the bonnet adapter 316 and a disc guide. The piston plate 318 engages a central portion of the diaphragm 332 opposite the spacer 320 and is configured to clamp the central portion of the diaphragm 323 against the spacer 320 and also to ensure appropriate structural integrity for the diaphragm 332 during operation (e.g., to limit central deformation thereof). In some cases, a lock washer 324 and nut 326 can be used to secure the piston plate 318, and thereby the diaphragm 332, relative to the disc holder 308, although other approaches are also possible. In some cases, the diaphragm assembly 302 can further include gaskets 328 configured to provide additional sealing between the valve body 304 and the bonnet 312.

In use, once the valve 300 is retrofitted with the diaphragm assembly 302, the valve 300 can operate similarly to the valve 200 illustrated in FIG. 5. For example, the diaphragm 332 in the valve 300 creates a diaphragm chamber 348 between the diaphragm 332 and the bonnet 312, similar to the diaphragm chamber 248 illustrated in FIG. 5. Correspondingly, a pressure transducer, e.g., similar to the pressure transducer 240, can extend through a pressure tap to monitor the pressure in the diaphragm chamber 348. The pressure in the diaphragm chamber 348 can then be monitored using the pressure transducer, substantially similarly to the pressure in the bellows chamber 228 or the diaphragm chamber 248, as described above relative to FIGS. 2 and 5, respectively. Corresponding alerts can then be provided accordingly. As such, the description and method of monitoring the pressure in the diaphragm chamber 348 and the configuration of FIG. 6 will be omitted.

Thus, embodiments of the disclosed invention can provide a system and method of determining failure in a back pressure balanced relief valve. The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A back pressure balanced relief valve system comprising:
   a piston;
   a balancing device that includes one of a pressure-balancing bellows or a pressure-balancing diaphragm and defines a first pressure chamber between the piston and the balancing device;
   a bonnet that defines a second pressure chamber between the bonnet and the piston;
   a bonnet spacer that at least partially surrounds the piston to define a piston orifice between the piston and the bonnet spacer that restricts fluid flow between the first pressure chamber and the second pressure chamber; and
   a pressure port in fluid communication with the first pressure chamber, the pressure port configured to receive or be in fluid communication with a pressure sensor for the pressure sensor to monitor the pressure in the first pressure chamber for indications of a potential failure of the balancing device.

2. The back pressure balanced relief valve system of claim 1, further comprising a control system configured to monitor the pressure in the first pressure chamber and provide an alert based on the pressure in the first pressure chamber.

3. The back pressure balanced relief valve system of claim 2, wherein the control system is further configured to provide the alert based on the pressure in the first pressure chamber being above a first reference pressure for longer than a threshold time.

4. The back pressure balanced relief valve system of claim 2, further comprising
   a second pressure port in fluid communication with the second pressure chamber, the second pressure port configured to receive or be in fluid communication with a second pressure sensor for the second pressure sensor to monitor the pressure in the second pressure chamber,
   wherein the control system is further configured to provide the alert based further on the pressure in the second pressure chamber.

5. The pressure balanced relief valve system of claim 4, wherein the control system is configured to provide the alert, to indicate a potential failure of the balancing device, based on determining that the pressure in the second pressure chamber is substantially less than the pressure in the first chamber or is below a second pressure threshold.

6. The pressure balanced relief valve system of claim 4, wherein the control system is configured to provide the alert, to indicate a potential bonnet malfunction, based on determining that the pressure in the second pressure chamber is not substantially less than the pressure in the first chamber or is not below a second pressure threshold.

7. The back pressure balanced relief valve system of claim 2, wherein the control system is further configured to calculate a leak rate for the balancing device based on the pressure in the first pressure chamber.

8. The back pressure balanced relief valve system of claim 7, further comprising:
   a bonnet on an opposing side of the piston from the first pressure chamber; and
   a flow meter configured to monitor a flow through the bonnet to atmosphere,
   wherein the control system is further configured to determine a rupture area of the balancing device based on a flow through the bonnet as measured by the flow meter.

9. The back pressure balanced relief valve system of claim 7, further comprising a bonnet that defines a second pressure chamber between the bonnet and the piston;
   wherein the control system is further configured to calculate a rupture area for the balancing device based on a measured pressure in the second pressure chamber and based on a back pressure of the back pressure balanced relief valve system, and to calculate the leak rate based on the calculated rupture area.

10. The back pressure balanced relief valve system of claim 7, wherein the control system is further configured to calculate a maximum leak rate for the back pressure balanced relief valve system, based on a maximum back pressure of the back pressure balanced relief valve system.

11. The back pressure balanced relief valve system of claim 1, wherein the balancing device includes the pressure-balancing diaphragm; and
   wherein the pressure-balancing diaphragm is part of a retrofit assembly configured for conversion of a valve to a diaphragm-operated back pressure balanced relief valve system.

12. A method of detecting a potential failure in a relief valve via a back pressure balanced relief valve system, the method comprising:
   using a first pressure sensor, electronically monitoring a pressure in a first pressure chamber via a pressure port in fluid communication with the first pressure chamber, the first pressure chamber being defined by a piston and by one of a bellows or a diaphragm of the relief valve;
   using a second pressure sensor, electronically monitoring a pressure in a second pressure chamber via a pressure port in fluid communication with the second pressure chamber, the second pressure chamber being defined by a bonnet and the piston; and
   using a control system in communication with the pressure sensor, providing an alert of a potential failure of the relief valve based on a pressure differential between the first pressure chamber and the second pressure chamber.

13. The method of claim 12, further comprising:
   providing the alert further based on the pressure differential being greater than 5%.

14. The method of claim 12, wherein providing the alert includes determining a leak rate from the first pressure chamber based on one or more of the pressure in the first pressure chamber, a back pressure of the relief valve, or a clearance area of the piston.

15. The method of claim 12, wherein providing the alert includes calculating a rupture area for the one of the bellows or the diaphragm based on the pressure in the first chamber and one or more of:
   a system back pressure; or
   a measured flow rate through the bonnet.

16. The method of claim 12, wherein providing the alert includes determining a maximum leak rate through the bonnet valve based on a maximum expected system back pressure.

17. The method of claim 12, wherein the first pressure chamber is defined by the piston and the diaphragm; and
   wherein the method further comprises, before electronically monitoring the pressure in the first chamber, installing in the relief valve a retrofit diaphragm assembly that includes the diaphragm and a bonnet adapter configured to seat between the bonnet and a body of the relief valve, to convert the relief valve into a diaphragm-operated back pressure balanced relief valve.

18. A back pressure balanced relief valve system for a valve, the valve having a valve body and a valve seat within the valve body, the back pressure balanced relief valve system comprising:
   a piston;
   a bonnet that defines a bonnet chamber between the piston and the bonnet;
   a bonnet spacer that at least partially surrounds the piston;
   a bellows that defines a bellows chamber between the piston and the bellows, the bellows chamber in fluid communication with the bonnet chamber across a clearance formed between the piston and the bonnet spacer;
   a first pressure sensor in fluid communication with the bellows chamber, the first pressure sensor configured to monitor non-transient pressure in the bellows chamber; and
   an electronic controller configured to monitor non-transient pressure in the bellows chamber to identify a potential bellows failure.

19. The back pressure balanced relief valve system of claim 18, wherein the electronic controller is configured to provide an alert of a potential bellows failure based on the non-transient pressure in the bellows chamber increasing above zero gauge pressure.

20. The back pressure balanced relief valve system of claim 18, further comprising a second pressure sensor in fluid communication with the bonnet chamber, wherein the electronic controller is configured to provide an alert of a potential bonnet malfunction based on the first and second pressure sensors detecting a pressure increase in the bonnet chamber and a pressure increase in the bellows chamber.

* * * * *